United States Patent [19]

Kulwin

[11] 4,312,467
[45] Jan. 26, 1982

[54] DOUBLE TIER AUTOMOTIVE SKI RACK

[76] Inventor: Richard Kulwin, 40 Bedford Rd., Armonk, N.Y. 10504

[21] Appl. No.: 224,629

[22] Filed: Jan. 12, 1981

[51] Int. Cl.³ ............................................. B60R 9/04
[52] U.S. Cl. .................................. 224/315; 224/323; 224/917; 211/60 SK
[58] Field of Search .............. 224/315, 309, 323, 324, 224/917; 211/60 SK; 414/462

[56] References Cited

U.S. PATENT DOCUMENTS 3,601,294 8/1971 Gjesdahl ......................... 224/917 X
4,050,706 9/1977 Kronstadt ....................... 224/324 X

*Primary Examiner*—Steven M. Pollard
*Attorney, Agent, or Firm*—Mark T. Basseches; Paula T. Basseches

[57] ABSTRACT

The present invention is directed to an automotive ski rack adapted to carry a multiplicity of pairs of skis. The apparatus is characterized by the provision of a frame adapted to be secured to an automobile roof, trunk deck or the like, a first pair of arms shiftable toward and away from the frame for clampingly supporting skis between the frame and said first set of arms, and a second set of arms pivotal toward and away from the first set of arms, whereby additional pairs of skis may be clamped between the sets of arms. The device, in accordance with a modification, is further characterized by the ability to remove the arms of the second pair where only small ski carrying capacity is desired, and by the provision of novel lock mechanism whereby a single locking device is adapted to retain the arms of both pairs in locked condition.

8 Claims, 10 Drawing Figures

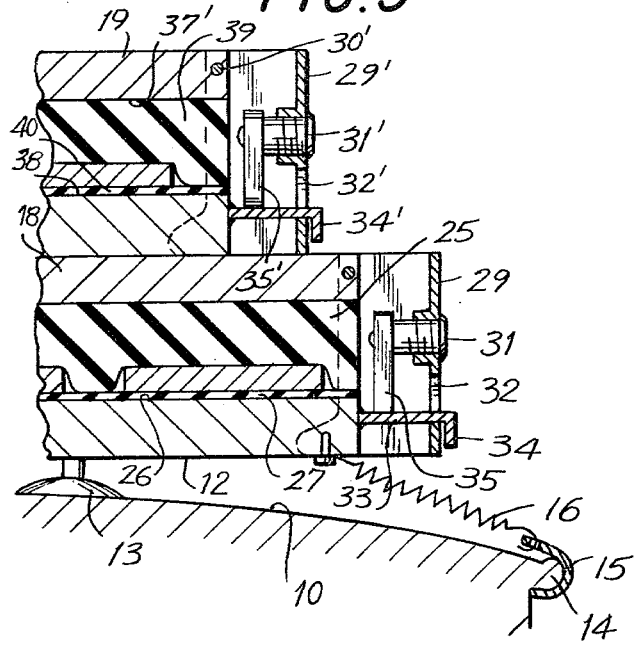
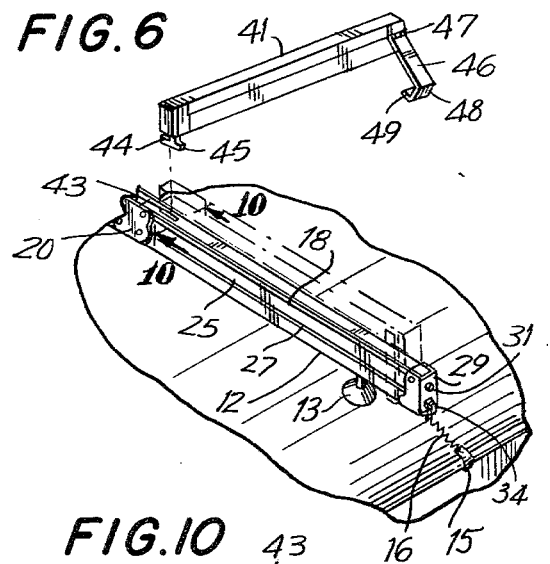
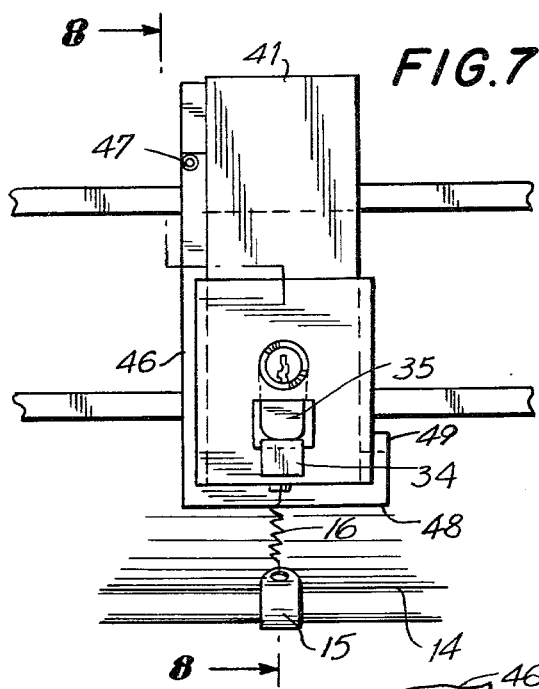
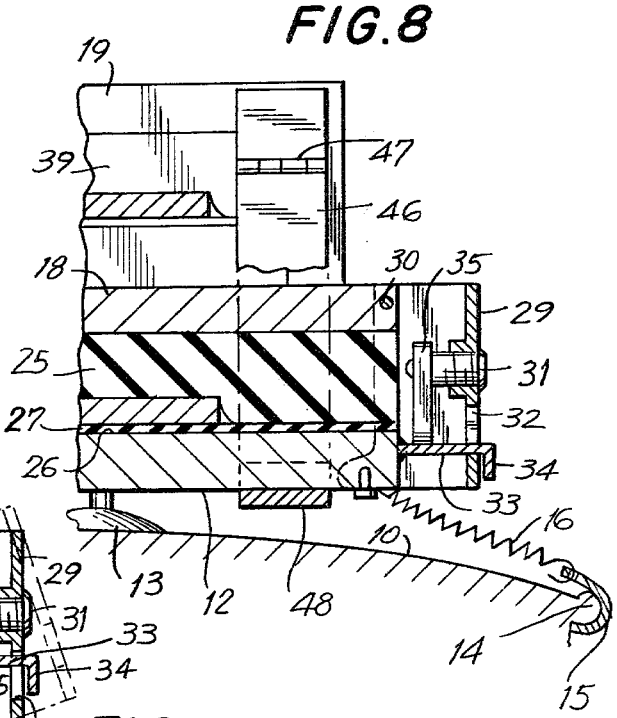
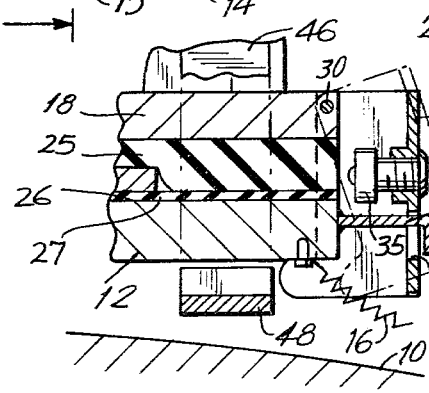

DOUBLE TIER AUTOMOTIVE SKI RACK

BACKGROUND OF THE INVENTION

1. Field of the Invention

The present invention is in the field of ski carrier apparatus and is directed more particularly to an improved ski carrier device adapted to hold multiple pairs of skis.

2. The Prior Art

As an adjunct to the increasing popularity of the sport of skiing, various devices have been constructed to enable skis to be conveniently secured to automobiles for facile and safe transportation.

While such devices have taken various forms, all of them generally include two frame mechanisms adapted to be secured in spaced relation to the roof or the trunk of an automobile. The devices generally include a support surface on the frame and a pair of pivotal hold-down arms. Skis are disposed on the support surfaces of the spaced frames while the hold-down arms are pivoted upwardly to provide clearance. After the skis are positioned, the hold-down arms are shifted downwardly to a carrying position in proximate spaced relation to the frame members whereby the skis are clamped between the frame and the arms.

Typically a locking mechanism is provided whereby the arms are locked in their carrying position so that if the car is left unattended with the skis attached, the same may not be removed. Generally, the means for mounting the frame to the car are covered when the hold-down arms are in locked position whereby the frames cannot be bodily removed from the car except by a person in possession of a key.

It will be readily recognized from the foregoing description that the conventional ski rack has a relatively limited ski carrying capacity.

With the recent increase in cross country skiing, it frequently occurs that skiers will wish to transport both cross country skis and skis suitable for downhill skiing. Thus, in a car transporting five or six skiers it may be necessary to carry ten or twelve pairs of skis, and no known ski rack has such capacity.

SUMMARY

The present invention may be summarized as directed to a double tier ski rack comprised of two frames, each of which may be connected to an automobile by essentially conventional means and each of which may incorporate pivotal hold-down arms, which are likewise essentially conventional.

The hold-down arms may be locked in place by the usual locking mechanism whereby a first series of skis may be clampingly supported between support surfaces of the spaced frames and the hold-down arms.

The present invention is characterized by the provision of a second set of hold-down arms pivotal relative to the first set of hold-down arms, whereby a second series of skis may be clampingly supported between the arms of the first and the second group, providing a double layer or tier of skis. The second arms may have a separate lock mechanism interposed between the second arms and the frame or the first arms.

Preferably, and for purposes of simplicity and cost saving, the second arms may carry at their distal ends a link member adapted to be clamped between the frame and the first hold-down arms, which link member is locked in place when the first arms are locked to the frame, whereby a single locking mechanism effectively locks both the first hold-down arms and the second hold-down arms against movement from the carrying to the loading position.

In accordance with a further preferred embodiment, the hold-down arms of the second series are releasibly and removably secured to the first hold-down arms. In this fashion the second hold-down arms may be readily stowed when not needed and applied only when it is necessary to carry a large number of pairs of skis.

It is accordingly an object of the invention to provide a double tiered automotive ski carrier having a large ski carrying capacity.

It is a further object of the invention to provide a carrier of the type described wherein a single locking mechanism maintains the arms of the first and second tiers in locked position.

A still further object of the invention is the provision of a device of the type described wherein the second series of arms is readily removable for storage in the unlocked condition of the assembly, yet subject to easy attachment when it is necessary to increase the carrying capacity of the device.

A still further object of the invention is the provision of a device of the removable arm type wherein actuation of the locking mechanism precludes the removal of the arms of the second tier.

To attain these objects and such further objects as may appear herein or be hereinafter pointed out, reference is made to the accompanying drawings, forming a part hereof, in which:

FIG. 5 is a vertical section taken on the line 5—5 of FIG. 4;

FIG. 6 is a fragmentary perspective view of a further embodiment of the invention;

FIG. 7 is a side elevational view of the embodiment of FIG. 6 in the locked condition thereof;

FIG. 8 is a discontinuous vertical section taken on the line 8—8 of FIG. 7;

FIG. 9 is a fragmentary view similar to FIG. 8 showing the position of the parts in the unlocked condition thereof;

FIG. 10 is a vertical section taken on the line 10—10 of FIG. 6.

Figure 1:
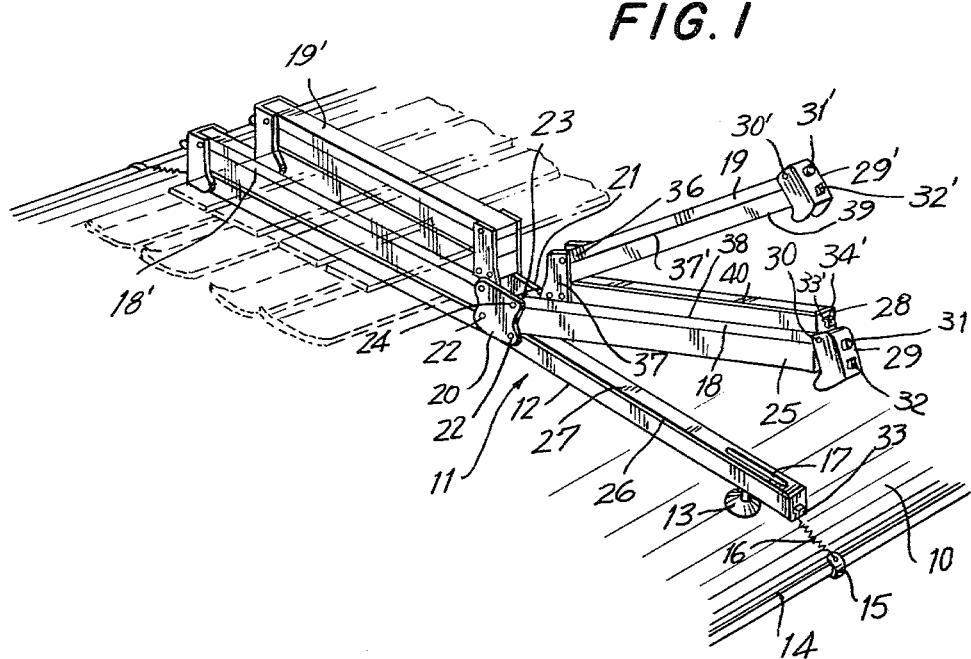
FIG. 1 is a perspective view of a ski carrier apparatus in accordance with the invention applied to an automobile.

Referring now to the drawings, there is shown in FIG. 1 a perspective view of a portion of the roof 10 of an automobile.

The ski carrying apparatus is comprised of two identical assemblies 11, only one being shown in the figures, which assemblies, as is well known, are secured in longitudinally spaced relation so as to be able to grip the carried skis adjacent the tip and tail ends, respectively.

The mounting assemblies include a frame portion 12 which extends transversely across the automobile and includes depending pods or suction cups 13, 13 whereby the frame member 12 is spaced from the roof of the automobile and the finish of the roof is preserved. As is conventional, the frame 12 is secured to the gutter portion 14 of the roof, as by a hook member 15 which overlaps the gutter. An adjustable cable 16 extends from the hook into the interior of the frame 12.

Preferably, the innermost end of the cable assembly 16 is connected to a tensioning assembly (not shown) located within the hollow frame 12 beneath adjustment slot 17, whereby the device may be applied to the roof of an automobile and tensioned so as to be retained in position. It will be understood that the adjustment slot 17 is inaccessible when skis are mounted for carrying, whereby the apparatus is secured against removal except to one who is provided with a key to the lock mechanism, which will hereinafter be described.

The frame assembly 12 carries a first pair of hold-down arms 18, 18' and a second pair of hold-down arms 19, 19'. Since the assembly is symmetrical about the longitudinal center line, a description of the construction to one side of said center line will suffice.

To the frame 12 there is mounted spaced upstanding brackets 20, 21. The brackets are fastened as by rivets 22 to the frame member 12.

Figure 2:
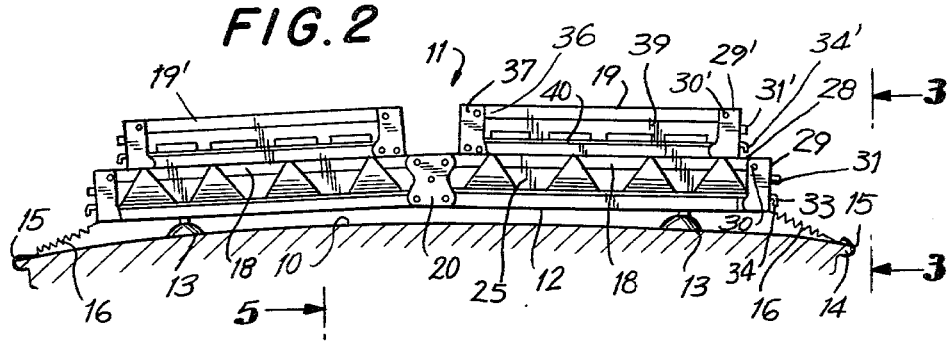
FIG. 2 is an end elevational view of the carrier device of FIG. 1.

The inner ends 23 of the arms 18 are pivotally connected as by rivets 24 to the brackets 20, 21, whereby the arms 18 are free to pivot about a horizontal axis. As is conventional, the under surface of the arms 18 is provided with a compressible foam cushioning pad 25. The upper or support surface 26 of the frame is likewise provided with an upwardly facing rubber or plastic cushioning strip 27, whereby skis disposed between the frame and the arms 18 will be safeguarded against contacting any of the metallic components of the frame or arms and will be dependably clamped against shifting when the arms 18 are moved to the closed or ski carrying condition shown in FIG. 2, for instance.

The arms 18 carry at their outer ends 28 a swingable cage member 29 pivotally connected as at 30 to the arms for movement about a horizontal axis. The cage 29, which is known per se, carries a lock assembly 31.

Figure 4:
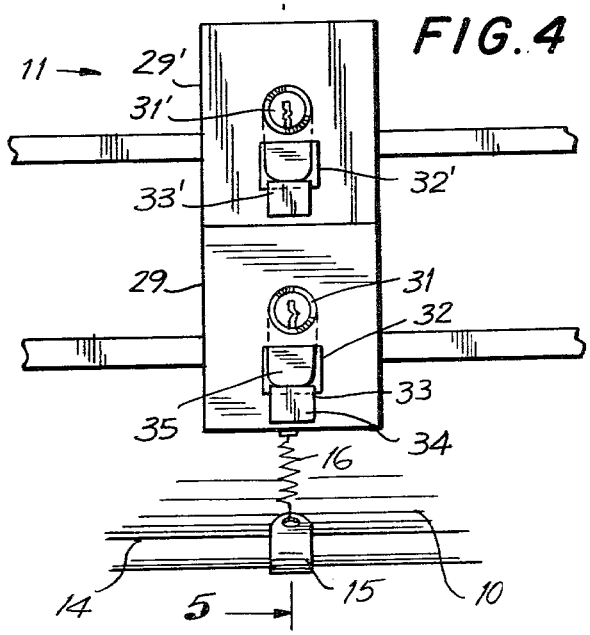
FIG. 4 is a view similar to FIG. 3 showing the position of the parts in the locked condition.
Figure 3:
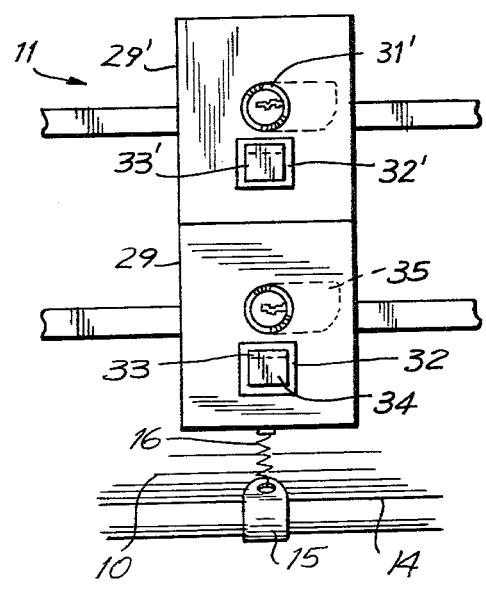
FIG. 3 is a side elevational view taken in the direction of the arrows 3—3 of FIG. 2 showing the position of the parts in the unlocked condition of the device.

Referring particularly to FIGS. 3 and 4, the cage 29 includes a cutout 32. The arm 18 is locked in its downward position by pressing the same downwardly with the cage 29 pivoted outwardly, as shown in FIG. 1, and then pivoting the cage inwardly so that L-shaped bracket 33 on the frame passes outwardly through the cutout 32.

The bracket 33 includes a depending leg 34 which outwardly laps the uppermost surface of the cage 29. When the lock mechanism 31 is actuated to the position shown in FIG. 4, the cam 35 is biased against the bracket 33. It will now be perceived that the arm is locked in its carrying position since the cage 29 can no longer be swung downwardly to a position whereat the cutout 32 is aligned with the locking leg 34 of the bracket 33.

The structure of the frame assembly, the manner of its mounting to the automobile, the structure of the lower arm 18 and the cage and lock mechanism as thus far described are entirely conventional, forming no part of the present invention, it being understood that numerous alternate structures may be satisfactorily employed.

In accordance with the improvement of the present invention, there is provided an upper arm assembly 19 having an inner end 36 pivotally connected to upstanding bracket 37 secured either to the frame 12 or, as is the case in the illustrated embodiment, to the lower arm 18.

In the embodiment of FIGS. 1 to 5, the upper arm 19 carries on its outer end a cage 29' and locking mechanism 31' substantially identical to the previously described cage and locking mechanism 29 and 31, respectively.

The cage member 29' of the upper arm assembly interacts with retainer bracket 34' mounted on the upper arm assembly 19 in the same manner as cage 29 interacts with bracket 34 as previously described—that is to say, that by operation of the cage 29' and lock mechanism 31', the arm 19 may be locked in parallel spaced relation to the arm 18.

The opposed surfaces 37', 38 of the upper and lower arms respectively are provided with foam or like cushion portions 39, 40, respectively, whereby skis may be clampingly retained between the two arms.

The operation of the device will be evident from the preceding description. In use, a first set or series of skis is laid between the support surface 26 of the frame and the cushion 25 of the lower arm assemblies 18. As noted previously, it will be understood that two identical assemblies, such as illustrated in FIG. 1, are mounted in longitudinally spaced relation on the automobile and, thus, the area adjacent the tips of the skis will be clamped in one said assembly and an area adjacent the tails in the other said assembly.

Optionally, a pair of skis may be stacked one atop the other and the stacked skis clamped in the manner aforesaid.

After the first series of skis is loaded between the frame 12 and arm 18, a second series of skis may similarly be loaded between the upper or cushioning surface 40 of the arm 18 and the cushion portion 39 of upper arm 19. The cage and lock mechanisms 29, 29' may be shifted to the positions shown in FIG. 2, whereby it will be perceived that two tiers or layers of skis are clampingly supported by the ski rack.

In accordance with the embodiment of FIGS. 6 to 10 wherein like parts have been given like reference numerals, there is disclosed a particularly useful modification of the invention which permits the ski rack assembly to be used in conventional fashion, i.e. for carrying a single tier of skis but enabling a series of removable arms 41 to be employed where the number of skis to be carried dictates use of a double tier arrangement.

In accordance with the noted second embodiment, the lower arms 18 include a transverse web 42—see FIG. 10, having a slot 43 formed therein, which slot runs lengthwise of the arms 18. The upper arms 41 include a depending neck portion 44 having a transversely extending trunnion 45.

As best seen in FIG. 6, when the trunnion 45 is aligned with the lengthwise dimension of slot 43, the same may be readily passed downwardly through the slot. In this condition, i.e. in the insertible condition of the trunnion through the slot, the upper arm 41 is oriented at right angles to the lower arm 18. After the trunnion has been passed downwardly through the slot 43, the arm 41 may be rotated 90° to the position shown in FIGS. 7 to 10.

In such position, it will be perceived that the trunnion will now underlie the slot and may not thereafter be removed from the slot until the arm has again been rotated to a position 90° offset from the lower arm 18.

Although the arm 41 is locked against removal from the arm 18, the upper arm 41 may be pivoted about a vertical axis defined by the uppermost edge of the trunnion 44, whereby the arm may be shifted between a loading position vertically displaced from the lower arm and a downward carrying or clamping position parallel to the lower arm 18.

In the embodiment of FIGS. 6 to 10 there is provided a novel mechanism whereby the single lock assembly 29, 31 is effective to lock both the upper and lower arms in carrying position.

More particularly, the arm 41 carries a link 46, hinged as at 47 so as to enable the link to be pivoted relative to the arm 41 about an axis parallel to the axis of elongation of the arm 41. The link 46 includes a base portion 48 and an upwardly directed hook portion 49.

In order to effect locking of both arms of the assembly of the described embodiment, the first group of skis is loaded between the frame 12 and the lower arm 18 in the manner previously described. A second group of skis is loaded between upper arm 41 and lower arm 18. Next the link 46 is swung such that the base portion 48 underlies the lower arm 18, as best viewed in FIGS. 7 and 8.

Thereafter, the arm 18 is depressed and cage 29 swung inwardly so that bracket 33 passes through aperture 32. Lock mechanism 31 is now shifted to the locked position shown in FIGS. 7 and 8, whereby the cam 35 bears against the bracket 33.

As will be seen, with the parts in the position indicated, the lower arm 18 will be locked to the frame 12 and, by virtue of the enveloping position of the hook member 49 of the link relative to the lower arm 18, the upper arm 41 will be locked in its downward or carrying position. When the lock cam 35 is rotated to its releasing position—see FIG. 9, it will now be possible to depress the lower arm 18, free the cage 29 from engagement with bracket 33, and raise the lower arms 18. The hook 49 may now be cleared from the lower arm 18, whereby the upper arms will be freed to move to the loading position for removal of the skis.

Numerous alternate locking arrangements will readily occur to those skilled in the art in the light of the present disclosure. Particularly, the link configuration may include a portion lying between the frame and the lower arm and may include a hook which encompasses the lower arm in the locked position rather than the frame, whereby the same result is achieved, i.e. locking of the lower arm to the frame also functions to lock the upper arm 41 against being released to loading position.

In the arrangement of the noted embodiment, the arms 41 may be readily removed for storage by simply rotating the same so that the trunnions 44 are in alignment with the slots 43, enabling the pivotal connection afforded by the trunnion and slot arrangement to be separated.

Numerous variations and modifications of the double tiered ski carrier assemblies described herein will occur to those skilled in the art and familiarized with the instant disclosure. By way of example, it is conceivable that still a further tier of skis could be mounted above the second tier by the provision of still further hold-down arms.

Details of construction such as the specific mechanism used to retain the frame to the automobile may likewise be varied, and many satisfactory connecting mechanisms are already known.

Likewise, as previously noted, details of the lock mechanism and the pivotal connection mechanism whereby the removable arms 41 are secured to the device may be modified without departing from the spirit of the invention.

Accordingly, the invention is to be broadly construed within the scope of the appended claims.

Having thus described the invention and illustrated its use, what is claimed as new and is desired to be secured by Letters Patent is:

1. A double tier automobile ski carrier comprising, in combination, a frame member, mounting means on said frame member for securing said member to the roof of an automobile, said frame member having an upwardly directed ski support surface, a first pair of hold-down arms connected to said frame member substantially medially thereof for pivotal movement about pivot axes normal to said frame member whereby said arms are shiftable between a carrying position in proximate parallel spaced relation to said support surface of said frame and a loading position angularly offset from said support surface, a second pair of hold-down arms, pivot means interposed between each of said second pair of hold-down arms and said frame for supporting said second pair of hold-down arms for pivotal movement toward and away from an arm of said first pair between a carrying position in proximate parallel spaced relation to an arm of said first pair and a loading position angularly offset from an arm of said first pair, cushion means on said support surface, the upper and lower surfaces of said arms of said first pair and the lower surface of said arms of said second pair, and lock means for releasibly securing said first and said second pairs of arms in said carrying position.

2. Apparatus in accordance with claim 1 wherein said pivot means are connected between an arm of said first pair and an arm of said second pair.

3. Apparatus in accordance with claim 1 wherein said pivot means comprise a releasable connection adapted to be separated when said arms of said second pair are in said loading position, and locked against separation when said arms of said second pair are in said carrying position.

4. Apparatus in accordance with claim 3 wherein said pivot means comprise a longitudinally directed slot formed on said arms of said first pair, and a transversely directed trunnion member formed on said arms of said second pair, said trunnion members being insertible through said slots when said arms of said second pair are in said loading position and underlying the walls defining said slots when said arms of said second pair are in said carrying position.

5. Apparatus in accordance with claim 1 wherein said lock means is interposed between said arms of said first pair and said frame, and said arms of said second pair include a link member securing said arms of said second pair against movement from said carrying position in the locked condition of said lock means.

6. A double tier automobile ski rack comprising a frame member having a ski support surface, mounting means on said frame member for securing the same to an automobile, a first pair of clamp arms pivotally mounted to said frame member for movement between a loading position whereat said arms are angularly offset from said frame member to a carrying position whereat said arms are in parallel proximately spaced relation to said support surface, a second pair of hold-down arms, complementally releasibly engageable pivot connector means interposed between one end of the arms of said second pair and said frame, each arm of said second pair, in the engaged condition of said pivot means, being shiftable toward and away from an arm of said first pair between a loading position whereat the arms of said first and second pairs are angularly offset to a carrying position whereat said arms of said first and second pairs are in parallel spaced relation, and lock means for retaining said arms of said first and second pairs in said carrying position, said pivot means being blocked from disengagement of said one end from said frame in the locked position of said lock means.

7. Apparatus in accordance with claim 6 wherein said pivot means comprises a longitudinally extending slot formed on the arms of one said pair and a trunnion member formed on the arms of the other said pair.

8. Apparatus in accordance with claim 7 wherein said lock means is interposed between the arms of said first pair and said frame, said lock means including a link member disposed at the other end of the arms of said second pair, said link member, in the locked condition of said lock means, being captured between said frame and an arm of said first pair.

* * * * *